E. D. PRIEST.
DYNAMO ELECTRIC MACHINE.
APPLICATION FILED OCT. 5, 1914.
1,222,465.
Patented Apr. 10, 1917.
2 SHEETS—SHEET 1.
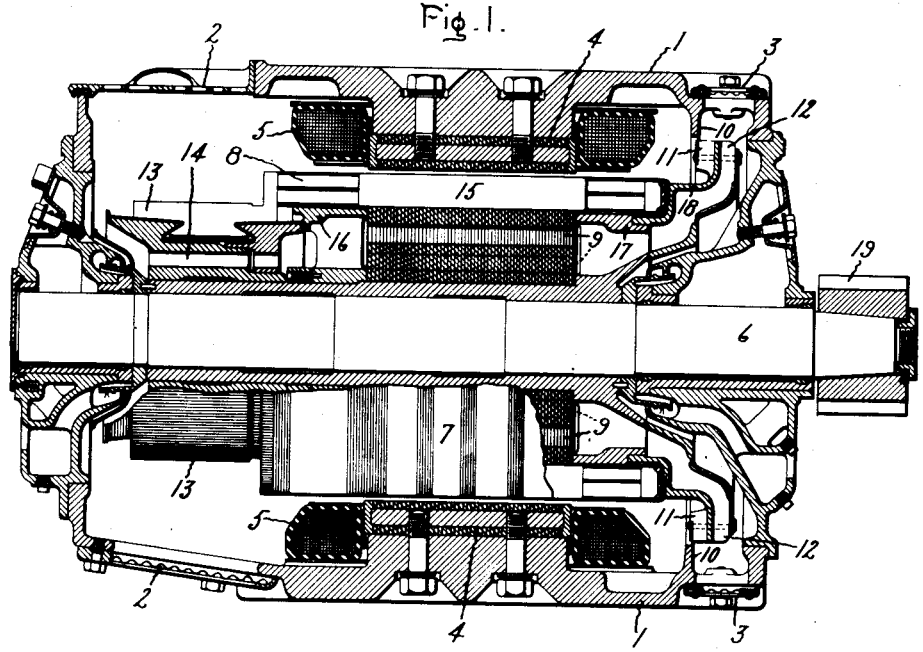
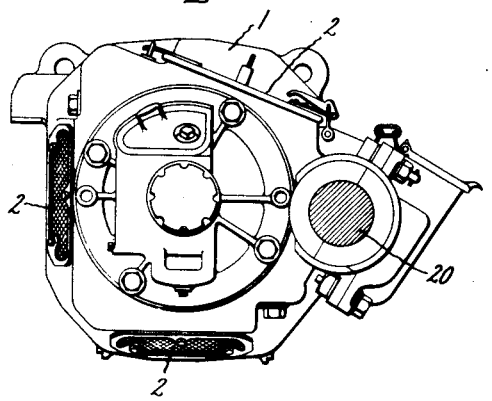
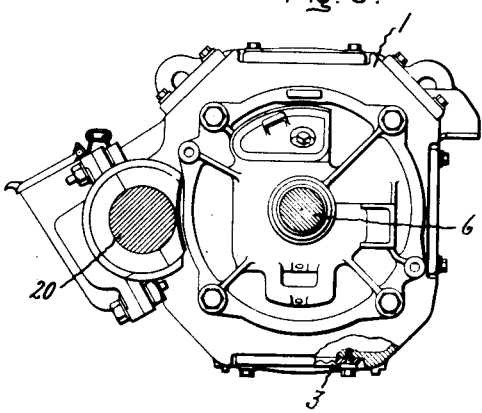
Witnesses:
Chas B Stokes
J. Elli Glen
Inventor:
Edward D Priest,
by Albert G. Davis
His Attorney.

E. D. PRIEST.
DYNAMO ELECTRIC MACHINE.
APPLICATION FILED OCT. 5, 1914.

1,222,465.

Patented Apr. 10, 1917.
2 SHEETS—SHEET 2.

Witnesses:
Chas. B Stokes
J. Ellis Glen.

Inventor:
Edward D. Priest.
by Albert G. Davis
His Attorney.

UNITED STATES PATENT OFFICE.

EDWARD D. PRIEST, OF SCHENECTADY, NEW YORK, ASSIGNOR TO GENERAL ELECTRIC COMPANY, A CORPORATION OF NEW YORK.

DYNAMO-ELECTRIC MACHINE.

1,222,465.  Specification of Letters Patent.  Patented Apr. 10, 1917.

Application filed October 5, 1914. Serial No. 864,975.

*To all whom it may concern:*

Be it known that I, EDWARD D. PRIEST, a citizen of the United States, residing at Schenectady, in the county of Schenectady, State of New York, have invented certain new and useful Improvements in Dynamo-Electric Machines, of which the following is a specification.

My invention relates to dynamo electric machines of the commutator type, the field members of which are provided with definite poles, and particularly to the ventilation of such machines, and has for its object to increase to a maximum the amount of cooling air blown through the machine, and thereby make it possible to greatly increase the output of the machine, or to reduce the size of the machine and obtain the same output as heretofore. To this end my invention consists in certain novel features of construction and arrangement of parts hereinafter described, and particularly pointed out in the claims.

Figure 4:
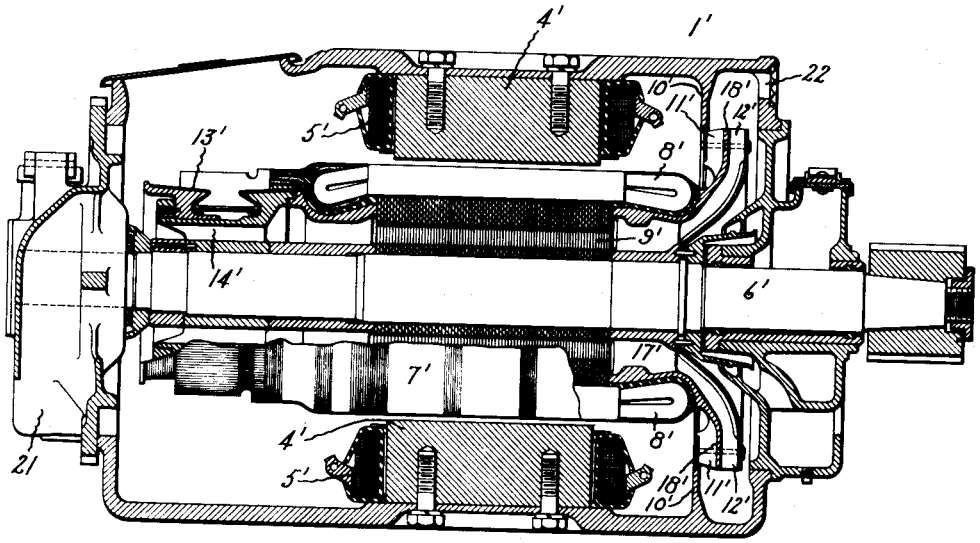
Figure 5:
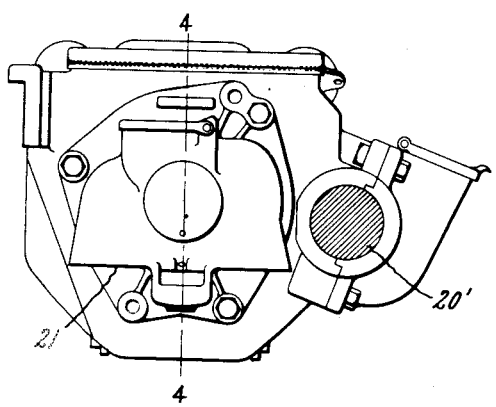
Figure 6:
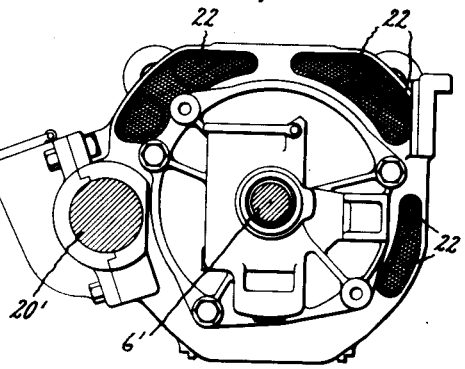

For a better understanding of my invention reference may be had to the following description taken in connection with the accompanying drawings in which Figure 1 is a longitudinal cross-section of a dynamo electric machine embodying my invention; Figs. 2 and 3 are elevation views of the ends of the machine of Fig. 1; Fig. 4 is a longitudinal cross-section of a dynamo electric machine embodying a modification of my invention taken on the line 4—4 of Fig. 5, and Figs. 5 and 6 are elevation views of the ends of the machine of Fig. 4.

In the drawings, I have shown my invention applied to railway motors to which it is particularly applicable. My invention is not limited to such machines, however, and it may be used in any type of dynamo electric machine.

Referring to Figs. 1, 2 and 3 of the drawings, 1 is an inclosing casing of a dynamo electric machine which is provided with inlet openings 2 and outlet openings 3. Projecting from the casing 1 are definite field magnet poles 4 on which are mounted windings 5. A shaft 6 is journaled in bearings in the casing and mounted thereon is a rotatable member or armature 7 provided with windings 8 and having longitudinal air passages 9 extending therethrough. Mounted on the shaft 6 at one end of the rotatable member are inner and outer radial fan members 11 and 12, extending beyond the periphery of the armature 7. The casing 1 is provided with a flange 10 adjacent to the outlet openings 3 and located between the outlet openings and the field windings 5 and which coöperates with the periphery of the inner fan member 11 at the inner end thereof, to prevent the reëntrance of heated air into the casing and the formation of eddy currents in the outlet passage connecting the periphery of the fan members with the outlet openings 3. These fan members are arranged to draw air through the inlet openings 2, to force the air in two parallel paths through the machine and exhaust it through the outlet openings 3, one of the paths being over the windings 5 between the field poles 4 and over the exterior surface of the rotatable member 7 and the other of said paths being through the longitudinal passages 9 in the rotatable member.

The armature 7 is provided with a commutator structure 13 at one end thereof which has longitudinal air passages 14 therethrough which communicate with the passages 9 in the armature 7. The armature 7 comprises laminations 15 which are held between end heads 16 and 17. The end head 17 at the end of the armature away from the commutator structure has a flange 18, on one side of which is mounted the fan 11 and on the other side of which is mounted the fan 12. The fan 11 extends beyond the periphery of the armature and the fan 12 is preferably also similarly extended as shown in the drawing, since its effectiveness is thereby increased. The inner fan 11 draws air through the inlet openings 2, forces it over the field windings 5 between the field poles and over the exterior surface of the commutator and armature and out through the outlet openings 3. The intake opening of the outer fan 12 on the other side of the flange communicates only with the passages in the armature and commutator structure. This fan draws air through the inlet openings 2, forces it through the longitudinal passages 14 in the commutator structure, the longitudinal passages 9 in the armature and out through the outlet openings 3. From this it will be seen that the amount of cooling air blown through the machine is a maximum and that the air is blown both over and under the parts that are liable to become the hottest. By providing two distinct and parallel paths for the cooling air, each with its own fan, it is possible by properly proportioning the parts to create any desired distribution of the cooling air between the field coils and the interior of the armature and commutator structure.

It will be seen from Fig. 1 of the drawings that the outer portion of the end head 16 overlaps the commutator structure and thus makes a joint through which air and dirt can not be drawn and at the same time centers the commutator. The end of the shaft 6 is provided with a pinion 19 by which motion is transmitted from the armature shaft to an axle 20 by means of a suitable gear, not shown.

The inlet and outlet openings 2 and 3 are shown as being provided with screens in order to prevent the entrance of dirt or other materials into the machine.

The construction shown in Figs. 4, 5 and 6 of the drawings is substantially like that of the other figures of the drawings with the exception of the position of the inlet opening 21 and the outlet openings 22 in the inclosing casing 1'. This casing has mounted therein a field member 4' provided with windings 5'. A shaft 6' is journaled in bearings in the casing and has mounted thereon an armature 7' provided with windings 8' and a commutator structure 13'. The armature has longitudinal passages 9' communicating with longitudinal passages 14' in the commutator structure. The end head 17' at the end of the armature away from the commutator structure has a flange 18' on one side of which is mounted fan 11' and on the other side of which is mounted the fan 12'. A flange 10' is provided on the motor casing 1' adjacent to the outlet openings 22 which coöperates with the periphery of inner fan 11' at the inner end thereof for the same purpose as pointed out in connection with the flange 10 in Fig. 1. The fan 11' draws air through the inlet opening 21, forces it over the field windings 5' between the field poles and over the exterior surface of the commutator and armature and out through the outlet openings 22. The intake opening of the fan 12' on the other side of the flange communicates only with the passages in the armature and commutator structure. This fan draws air through the inlet opening 21, forces it through the longitudinal passages 14' in the commutator structure, the longitudinal passages 9' in the armature and out through the outlet openings 22. This construction affords a protection against the entrance of dirt or moisture into the interior of the machine and is particularly useful in connection with railway motors which operate under street cars, as such motors are always located close to the surface of the street and are liable to have water splashed upon them. The outlet openings 22 in these figures of the drawings are shown as being located in the end of the casing instead of in the side of the casing as in Fig. 1 and are covered by screens which are spot welded in place.

What I claim as new and desire to secure by Letters Patent of the United States, is:—

1. A dynamo electric machine comprising an inclosing casing provided with inlet and outlet openings in opposite ends thereof, field magnet poles projecting from said casing, field windings on said poles, a shaft having bearings in said casing, an armature mounted on said shaft and provided with a commutator structure at one end, said armature and commutator structure having longitudinally extending communicating air passages therethrough, inner and outer radial fan members carried by said armature shaft at one end of said armature, said inner fan member extending beyond the periphery of the armature and adapted to draw air into the dynamo electric machine through said inlet opening or openings and to force it over said field windings between said field poles and over the exterior surfaces of said commutator and armature and out through said outlet opening, said outer fan member having an intake opening communicating only with the passages in the armature and commutator structure, and a flange carried by said casing adjacent to said outlet opening or openings coöperating with the periphery of said inner fan member at the inner end thereof.

2. A dynamo electric machine comprising an inclosing casing provided with inlet and outlet openings in opposite ends thereof, field magnet poles projecting from said casing, field windings on said poles, a shaft having bearings in said casing, an armature mounted on said shaft provided with a commutator structure at one end, said armature and commutator structure having longitudinally extending communicating air passages therethrough, inner and outer radial fan members carried by said armature shaft at the end of said armature away from said commutator structure, said inner fan member extending beyond the periphery of the armature and adapted to draw air into the dynamo electric machine through said inlet opening or openings and to force it over said field windings between said field poles and over the exterior surfaces of said commutator and armature and out through said outlet opening, said outer fan member having an intake opening communicating only with the passages in the armature and commutator structure, and a flange carried by said casing adjacent to said outlet opening or openings coöperating with the periphery of said inner fan member at the inner end thereof.

3. A dynamo electric machine comprising an inclosing casing provided with inlet and outlet openings in opposite ends thereof, field magnet poles projecting from said casing, field windings on said poles, a shaft having bearings in said casing, an armature mounted on said shaft provided with a commutator structure at one end, said armature and commutator structure having longitudinally extending communicating air passages therethrough, an end head at the end of said armature away from said commutator, said end head having a flange extending beyond the periphery of the armature, inner and outer radial fan members, one mounted on one side of said flange and the other mounted on the other side of said flange, said inner fan member being adapted to draw air into the dynamo electric machine through said inlet opening or openings and to force it over said field winding between said field poles and over the exterior surfaces of said commutator and armature and out through said outlet opening, said outer fan member having an intake opening communicating only with the passages in the armature and commutator structure, and a flange carried by said casing adjacent to said outlet opening or openings coöperating with the periphery of said inner fan member at the inner end thereof.

4. A dynamo electric machine comprising an inclosing casing provided with inlet and outlet openings in opposite ends thereof, field magnet poles projecting from said casing, field windings on said poles, a shaft having bearings in said casing, an armature mounted on said shaft and provided with a commutator structure at one end, said armature and commutator structure having longitudinally extending communicating air passages therethrough, radial fan members carried by said armature shaft at one end of said armature, one of said fan members extending beyond the periphery of the armature and adapted to draw air into the dynamo electric machine through said inlet opening or openings and to force it over said field windings between said field poles and over the exterior surfaces of said commutator and armature and out through said outlet opening, another of said fan members having an intake opening communicating only with the passages in the armature and commutator structure, and a flange carried by said casing between said outlet opening or openings and said field windings coöperating with the periphery of said first mentioned fan member.

5. A dynamo electric machine comprising an inclosing casing provided with inlet and outlet openings in opposite ends thereof, field magnet poles projecting from said casing, field windings on said poles, a shaft having bearings in said casing, an armature mounted on said shaft provided with a commutator structure at one end, said armature and commutator structure having longitudinally extending communicating air passages therethrough, radial fan members carried by said armature shaft at the end of said armature away from said commutator structure, one of said fan members extending beyond the periphery of the armature and adapted to draw air into the dynamo electric machine through said inlet opening or openings and to force it over said field windings between said field poles and over the exterior surfaces of said commutator and armature and out through said outlet opening, another of said fan members having an intake opening communicating only with the passages in the armature and commutator structure, and a flange carried by said casing between said outlet opening or openings and said field windings coöperating with the periphery of said first mentioned fan member.

6. A dynamo electric machine comprising an inclosing casing provided with inlet and outlet openings in opposite ends thereof, field magnet poles projecting from said casing, field windings on said poles, a shaft having bearings in said casing, an armature mounted on said shaft provided with a commutator structure at one end, said armature and commutator structure having longitudinally extending communicating air passages therethrough, an end head at the end of said armature away from said commutator, said end head having a flange extending beyond the periphery of the armature, radial fan members, one mounted on one side of said flange and the other mounted on the other side of said flange, the one fan member being adapted to draw air into the dynamo electric machine through said inlet opening or openings and to force it over said field winding between said field poles and over the exterior surfaces of said commutator and armature and out through said outlet opening, the other fan member having an intake opening communicating only with the passages in the armature and commutator structure, and a flange carried by said casing between said outlet opening or openings and said field windings coöperating with the periphery of said first mentioned fan member.

In witness whereof, I have hereunto set my hand this 2nd day of October, 1914.

EDWARD D. PRIEST.

Witnesses:
H. L. ANDREWS,
BENJAMIN B. HULL.